United States Patent
Ogawa et al.

(10) Patent No.: US 10,684,194 B2
(45) Date of Patent: Jun. 16, 2020

(54) ENGINE TEST APPARATUS AND METHOD

(71) Applicant: A&D COMPANY, LIMITED, Tokyo (JP)

(72) Inventors: Atsushi Ogawa, Kitamoto (JP); Jun Uchida, Kitamoto (JP)

(73) Assignee: A&D COMPANY, LIMITED, Tokyo (JP)

( * ) Notice: Subject to any disclaimer, the term of this patent is extended or adjusted under 35 U.S.C. 154(b) by 173 days.

(21) Appl. No.: 15/775,229

(22) PCT Filed: Nov. 8, 2016

(86) PCT No.: PCT/JP2016/083020
§ 371 (c)(1),
(2) Date: May 10, 2018

(87) PCT Pub. No.: WO2017/082225
PCT Pub. Date: May 18, 2017

(65) Prior Publication Data
US 2018/0372586 A1   Dec. 27, 2018

(30) Foreign Application Priority Data

Nov. 12, 2015 (JP) ................................. 2015-222482

(51) Int. Cl.
*G01M 15/04* (2006.01)
(52) U.S. Cl.
CPC ................................. *G01M 15/044* (2013.01)
(58) Field of Classification Search
CPC .................................................. G01M 15/044
See application file for complete search history.

(56) References Cited

U.S. PATENT DOCUMENTS

| | | | | |
|---|---|---|---|---|
| 9,164,005 B2* | 10/2015 | Takahashi | ................ | H02P 6/06 |
| 9,255,856 B2* | 2/2016 | Takahashi | ................ | G01L 5/24 |
| 9,335,228 B2* | 5/2016 | Takahashi | ................ | G01L 3/22 |
| 10,371,589 B2* | 8/2019 | Akiyama | ................ | G01L 3/04 |
| 2015/0101421 A1* | 4/2015 | Takahashi | ................ | H02P 6/06 |
| | | | | 73/862.325 |

FOREIGN PATENT DOCUMENTS

| | | |
|---|---|---|
| JP | S56-002295 B2 | 1/1981 |
| JP | 2010-019652 A | 1/2010 |
| JP | 2010-043940 A | 2/2010 |
| JP | 2012-088187 A | 5/2012 |

OTHER PUBLICATIONS

PCT/ISA/210, "International Search Report for International Application No. PCT/JP2016/083020," dated Jan. 24, 2017.

\* cited by examiner

*Primary Examiner* — Freddie Kirkland, III
(74) *Attorney, Agent, or Firm* — Manabu Kanesaka

(57) ABSTRACT

To provide an engine test apparatus and method, which can easily enhance the test accuracy.
The engine test apparatus 10 of the present invention includes: a dynamometer 14, which applies torque to an output shaft of an engine 12 via a shaft member 32; a torque meter 36, which is disposed on the shaft member 32 and measures torque; and a control device 20, which computes a torque command value using a rotational frequency feedback value in order to apply feedback control based on a rotational frequency to the dynamometer 14. The control device 20 subtracts a value measured by the torque meter 14 from the torque command value to find a correction torque command value and controls the dynamometer 14 using the correction torque command value.

7 Claims, 5 Drawing Sheets

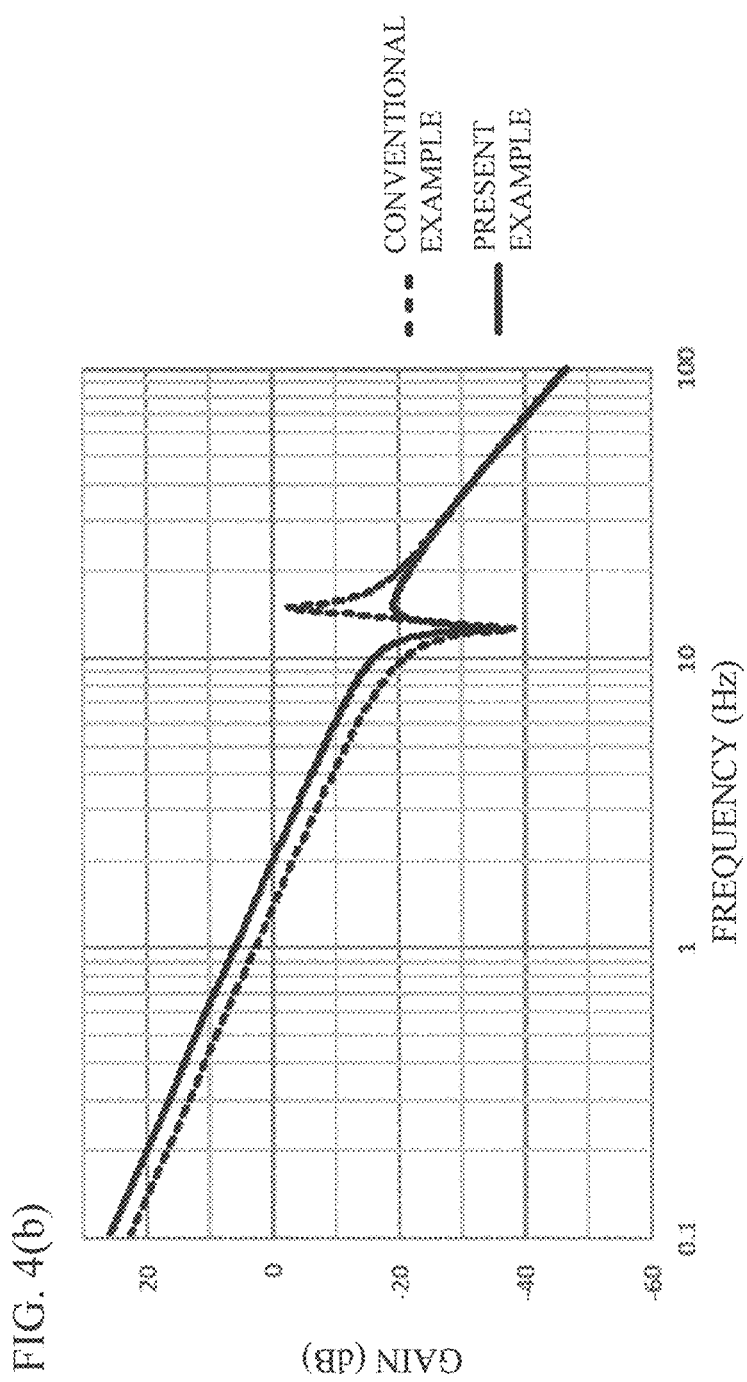

ENGINE TEST APPARATUS AND METHOD

RELATED APPLICATIONS

The present application is National Phase of International Application No. PCT/JP2016/083020 filed Nov. 8, 2016, and claims priority from Japanese Application No. 2015-222482, filed Nov. 12, 2015, the disclosure of which is hereby incorporated by reference herein in its entirety.

TECHNICAL FIELD

The present invention relates to an engine test apparatus and method, and more particularly to an engine test apparatus and method, which exhibits excellent control performance in terms of robustness or responsiveness.

BACKGROUND ART

An engine bench is known as a device to be used for testing engine performance (refer to Patent Literature 1). An engine bench is a testing device configured to evaluate whether a test engine includes predetermined performance or not, and the test engine is attached to a bench test machine (an engine bench). An output shaft of the engine is connected with a dynamometer via a torque meter, and rotation force of the engine is absorbed by the dynamometer. A dynamometer is generally controlled by feedback control, so that the rotational frequency of the dynamometer is controlled to be a target rotational frequency.

CITATION LIST

Patent Literature

Patent Literature 1: JP 2012-88187 A

SUMMARY OF INVENTION

Technical Problem

A conventional engine bench, however, has a problem that a deviation arises between a target value and an actual value of rotational frequency, and the deviation becomes especially large in a test under transient conditions. As it is required to optimize PI control conditions in order to enhance the test accuracy, setting conditions for each test engine through repeated trials and errors takes much time and effort. There is another problem that optimizing PI control conditions cannot sufficiently improve the accuracy under transient conditions.

The present invention has been made in view of such circumstances, and an object thereof is to provide an engine test apparatus and method, which can easily enhance the test accuracy.

Solution to Problem

In order to achieve the object, the invention according to claim 1 provides an engine test apparatus including: a dynamometer, which applies torque to an output shaft of an engine via a shaft; a torque meter configured to measure torque of the shaft; and a control device, which computes a torque command value using a rotational frequency feedback value obtained by measuring a rotational frequency of the dynamometer in order to apply feedback control based on the rotational frequency to the dynamometer, wherein the control device subtracts a value measured by the torque meter from the torque command value to find a correction torque command value and controls the dynamometer using the correction torque command value.

The present inventors have found that it is possible to cancel, on the side of the dynamometer, a torque fluctuation of the side of the engine and remarkably decrease the above-mentioned error by subtracting a value measured by a torque meter from a torque command value, which is computed using a rotational frequency feedback value, to find a correction torque command value and controlling the dynamometer on the basis of the correction torque command value. The present invention has been made on the basis of such finding and can decrease an error between a target value and an actual value of rotational frequency as much as possible by subtracting a value measured by a torque meter from a torque command value to find a correction torque command value and controlling the dynamometer on the basis of the correction torque command value. This makes it possible to deal with a test under transient conditions and cause an actual value to follow a target value with high accuracy even when a target value is fluctuated. Furthermore, the present invention can be achieved by only adding extremely simple arithmetic processing, and it is unnecessary to input an inertia value of an engine or a dynamometer. Accordingly, it is possible to easily enhance the test accuracy for various kinds of engines.

In order to achieve the object, the invention according to claim 2 provides an engine test method of causing a dynamometer to give a load to an output shaft of an engine via a shaft and applying feedback control based on a rotational frequency to the dynamometer, the engine test method including the steps of: subtracting a measured torque value of the shaft from a torque command value, which is computed using a rotational frequency feedback value obtained by measuring a rotational frequency of the dynamometer, to find a correction torque command value; and controlling the dynamometer using the correction torque command value.

Advantageous Effects of Invention

It is possible with the present invention to decrease an error between a target value and an actual value of rotational frequency as much as possible and achieve an accurate test by subtracting a value measured by a torque meter from a torque command value, which is computed using a rotational frequency feedback value, to find a correction torque command value and controlling the dynamometer on the basis of the correction torque command value.

BRIEF DESCRIPTION OF DRAWINGS

FIGS. 4(a) and 4(b) are explanatory views for explaining the action of an engine test apparatus of this embodiment.

DESCRIPTION OF EMBODIMENTS

Figure 1:
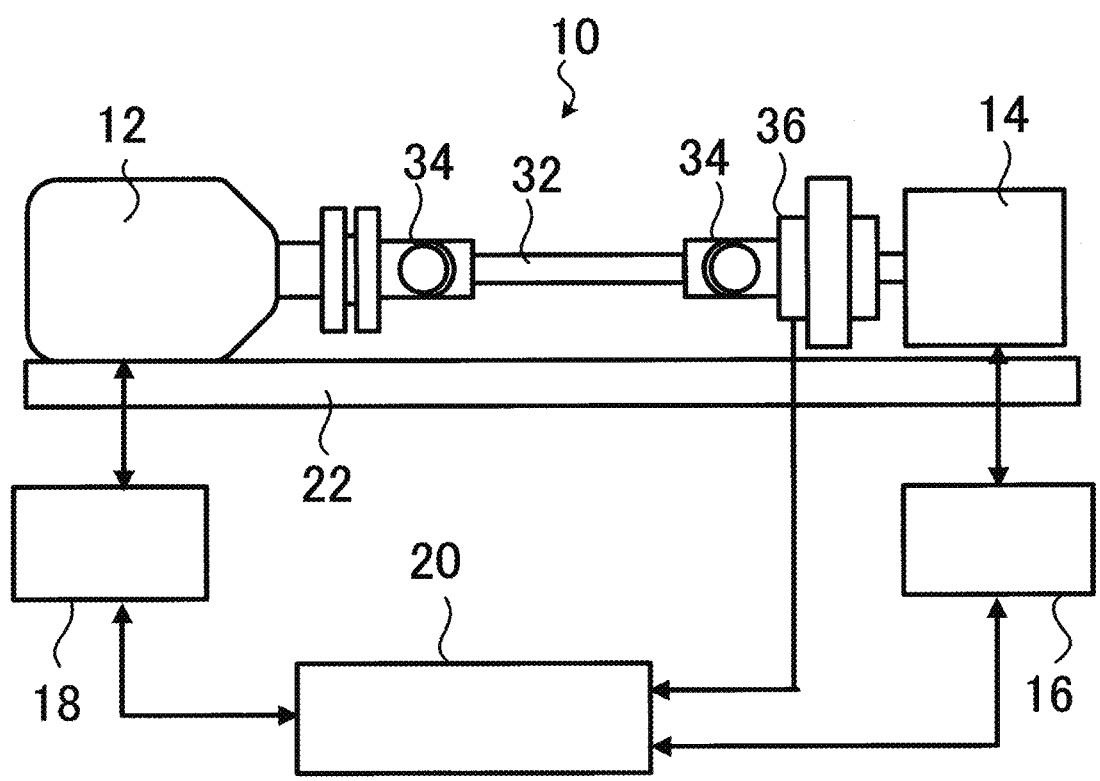
FIG. 1 is a schematic view illustrating a rough configuration of an engine test apparatus of this embodiment.

A preferable embodiment of an engine test apparatus and method according to the present invention will be described with reference to the appended drawings. FIG. 1 is a schematic view illustrating a rough configuration of an engine test apparatus 10 to which an embodiment of the present invention is applied.

The engine test apparatus 10 illustrated in the figure is a device configured to measure and evaluate the performance of an engine 12 to be tested and is mainly composed of a dynamometer 14, a shaft member 32, a dynamo control unit 16, an engine control unit 18, and a control device 20. Although this embodiment will be explained by dividing the same into the dynamo control unit 16, the engine control unit 18, and the control device 20, it is to be noted that a part or the whole of these components may be configured together.

The engine 12 is fixed on a frame 22, and an output shaft thereof is connected with the dynamometer 14 via the shaft member 32. The shaft member 32 is configured by coupling a plurality of shaft members such as a main shaft, and a universal joint 34 is interposed at each coupling part. A torque meter 36 is attached to the shaft member 32 and measures torque (a shaft torque value) of the shaft member 32.

The dynamometer 14 is a device configured to give predetermined load torque to the engine 12 and has a structure such that load torque can be set by varying current/voltage. The dynamometer 14 is connected with the dynamo control unit 16, which varies and controls current/voltage to be applied to the dynamometer 14 and controls load torque of the engine 12.

On the other hand, the engine 12 is connected with the engine control unit 18. The engine control unit 18 is means configured to drive and control the engine 12 by giving a control command value such as throttle opening or an ignition advance angle to the engine 12 and is normally implemented by an ECU, or an engine control circuit obtained by adding a bypass circuit to an ECU. A digital signal processor (DSP) called as a virtual ECU may be employed instead of an ECU to implement the engine control unit 18. The engine control unit 18 gives a control parameter (e.g., predetermined throttle opening) to the engine 12. This causes the engine 12 to rotate, and the rotation is transmitted to the dynamometer 14 via the shaft member 32. It is to be noted that the control parameter to be given from the engine control unit 18 may include various parameters such as fuel injection volume, air injection volume, mixture ratio of fuel and air, ignition time (in case of gasoline engine), or a fuel injection control method (in case of diesel engine) in addition to a rotational frequency or throttle opening.

The above-described dynamometer 14, dynamo control unit 16, engine control unit 18, and torque meter 36 are connected with the control device 20. The control device 20 includes a function of applying feedback control to the dynamometer 14 or the engine 12 via the dynamo control unit 16, the engine control unit 18, or the like. For example, a rotational frequency target value or a torque target value of the engine 12 is set (inputted) at the control device 20, so that the control device 20 is configured to determine and output a throttle opening command value to be the rotational frequency target value, or to compute a torque value of the dynamometer 14 required therefor and output a torque command value, which is calculated on the basis of the computed value, to the dynamo control unit 16.

Figure 2:
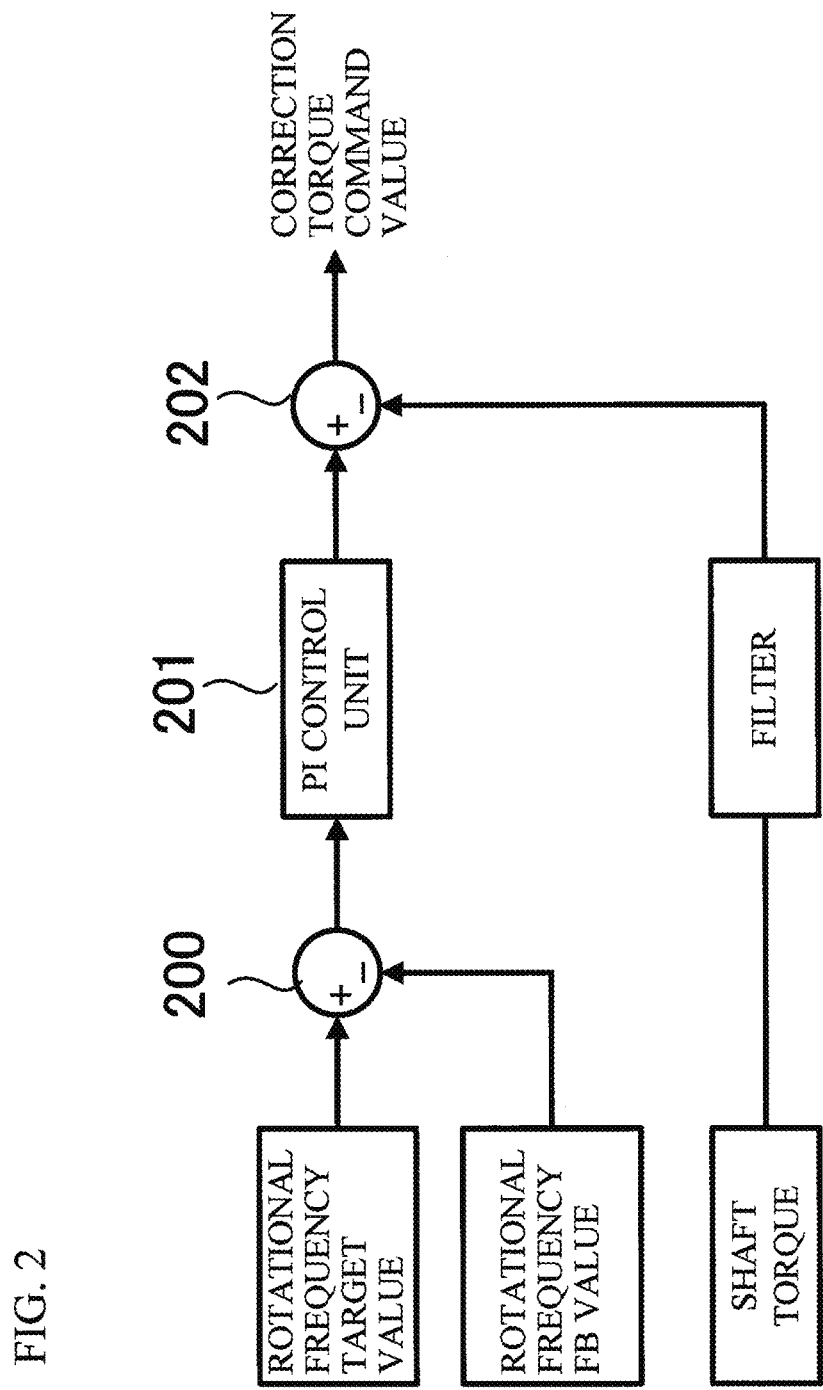
FIG. 2 is a schematic view for explaining arithmetic processing to be performed by a control device of this embodiment.

FIG. 2 is a schematic view for explaining arithmetic processing, which is performed by the control device 20 of this embodiment for controlling the operation of the dynamometer 14. As illustrated in the figure, the control device 20 includes a rotational frequency differential value calculating unit 200, a PI control unit 201, and a correction torque command value calculating unit 202 as components to be used for controlling the operation of the dynamometer 14. The rotational frequency differential value calculating unit 200 calculates a difference (a differential value) between a rotational frequency target value and a rotational frequency FB value and outputs a difference (a differential value) calculated by the PI control unit 201. Here, a rotational frequency target value is a value preset (inputted) at the control device 20 and includes not only a case of steady conditions but also a case of transient conditions. Moreover, a rotational frequency FB value (a rotational frequency feedback value) is a value of an actually measured rotational frequency (a rotational frequency of a rotation axis of the dynamometer 14) and is inputted from an encoder, which is built in the dynamometer 14, or the like to the control device 20, for example.

Moreover, a parameter relating to PI control is preset at the PI control unit 201. The PI control unit 201 accepts input of a difference (a differential value) between a rotational frequency target value and a rotational frequency FB value and calculates (computes) a torque command value to be used for applying feedback control to the dynamometer 14 using the differential value and the preset parameter. In addition, the PI control unit 201 outputs a torque command value, which is obtained by computing, to the correction torque command value calculating unit 202. Regarding a conventional device, the torque command value is outputted to the dynamo control unit 16, and feedback control is applied to the dynamometer 14. It is to be noted that the torque command value calculating method is a general technique performed by a conventional device, and detailed description thereof will be omitted.

The correction torque command value calculating unit 202 accepts a torque command value, which is outputted from the PI control unit 201, and a shaft torque value, which is outputted from the torque meter 36, and finds "Correction Torque Command Value ("Correction Torque Command Value"="Torque Command Value"–"Shaft Torque Value") by subtracting the shaft torque value from the torque command value. In addition, the correction torque command value calculating unit 202 outputs the correction torque command value to the dynamo control unit 16 and controls the operation of the dynamometer 14. It is to be noted that the shaft torque value from the torque meter 36 may be transmitted through a filter or an amplifier as needed.

Although the hardware structure of the control device 20 is not especially limited, it is to be noted that the control device 20 can be constituted of a computer (one or a plurality of computers) including a CPU, an auxiliary storage, a main storage, a network interface, and an input/output interface, for example. In such a case, the auxiliary storage stores a program to be used for implementing "a function of applying feedback control to the operation of the engine 12"; and "a function of applying feedback control to the operation of the dynamometer 14 (functions of the rotational frequency differential value calculating unit 200, the PI control unit 201, and the correction torque command value calculating unit 202)". In addition, "a function of applying feedback control to the operation of the engine 12", and "a function of applying feedback control to the operation of the dynamometer 14" can be implemented when the CPU loads the program to the main storage and executes the program.

Figure 3A:
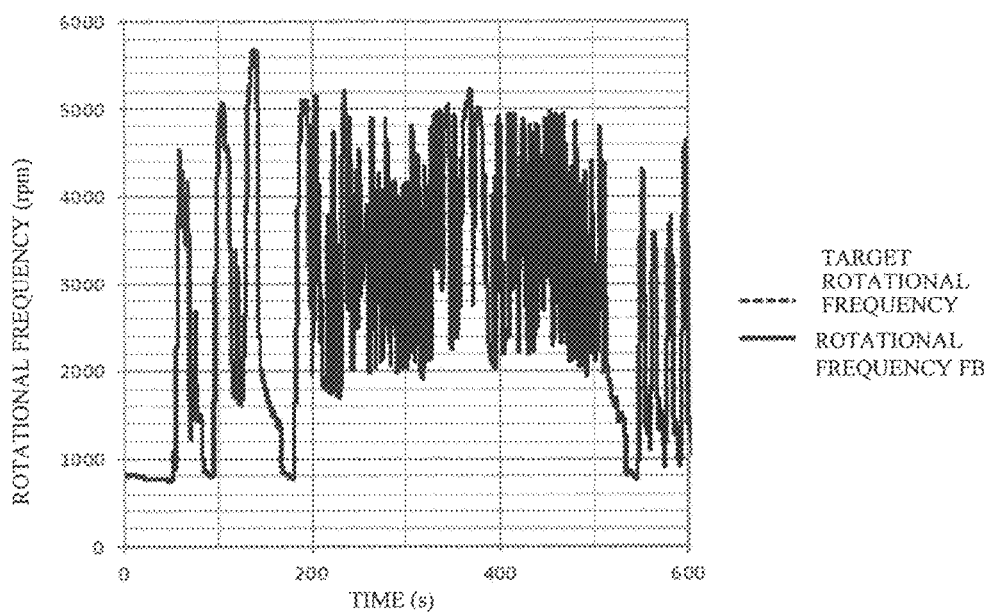
FIGS. 3(a) to 3(c) are explanatory views for explaining the action of an engine test apparatus of this embodiment.
Figure 3B:
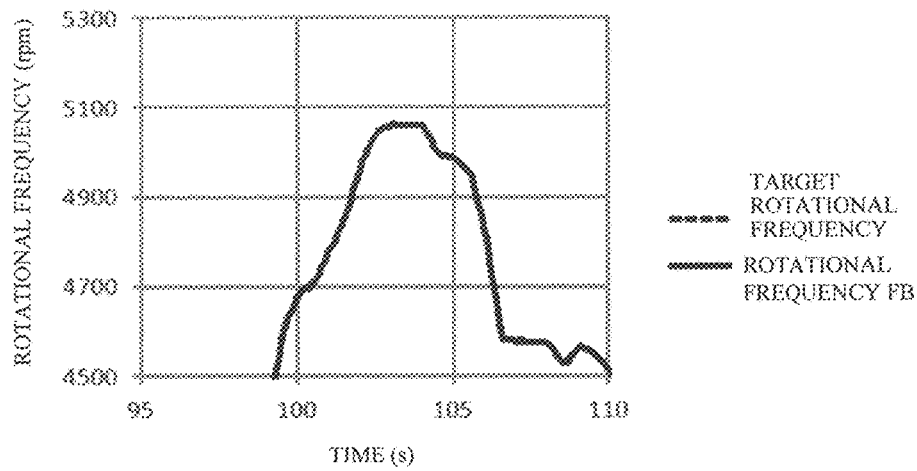

Next, the action of the engine test apparatus 10 having the above structure will be described. FIGS. 3(*a*) to 3(*c*) illustrate a test result of tracing Mode US06 in order to explain the action of this embodiment. FIG. 3(*a*) illustrates variation with time of the rotational frequency of the dynamometer 14, and FIG. 3(b) is a view wherein a part of FIG. 3(a) is enlarged. Moreover, FIG. 3(c) illustrates a result obtained when a similar test is performed at a conventional device (i.e., a device which uses a feedback control value found at the PI controller 21 as it is as a torque command value).

Figure 3C:
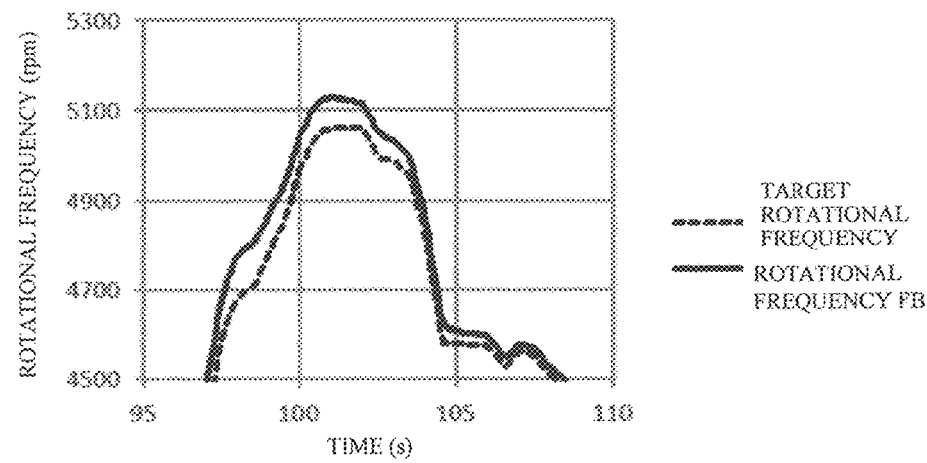

It is to be noted that an actual value of rotational frequency of the dynamometer 14 is shown by a solid line and a target value of rotational frequency of the engine 12 is shown by a dotted line in any of FIGS. 3(a), 3(b), and 3(c), though the lines overlap with each other and are shown as one line in FIGS. 3(a) and 3(b).

Regarding a conventional device, an actual value of rotational frequency of the dynamometer 14 is slightly deviated from a target value of rotational frequency of the engine 12 as is clear from FIG. 3(c) This indicates that rotational frequency becomes different between the side of the engine 12 and the side of the dynamometer 14 due to torque fluctuation, which appears in torque generated at the engine 12. As described above, a conventional device has a problem that an actual value is largely deviated from a target value when a test is performed under transient conditions. In order to resolve such a problem, it is common to optimize the parameter at the PI controller 21. There is, however, not only a problem that such work is extremely difficult and takes much time and effort but also a problem that it is difficult to make a target value and an actual value coincide with each other with high accuracy under transient conditions.

On the other hand, regarding the engine test apparatus 10 of this embodiment, an actual value of rotational frequency of the dynamometer 14 and a target value of rotational frequency of the engine 12 substantially coincide with each other as illustrated in FIGS. 3(a) and 3(b). In other words, a target value and an actual value substantially coincide with each other even under transient conditions.

As described above, this embodiment subtracts a value of the torque meter 36 from a torque command value, which is found at the PI control unit 201, to find a correction torque command value and controls the dynamometer 14 on the basis of the correction torque command value. As a result, the dynamometer 14 is controlled in a state where a differential of torque applied to both ends of the shaft member 32 is kept as small as possible. This makes it possible to suppress a rotational frequency deviation based on a differential of torque and achieve an accurate test.

Figure 4A:
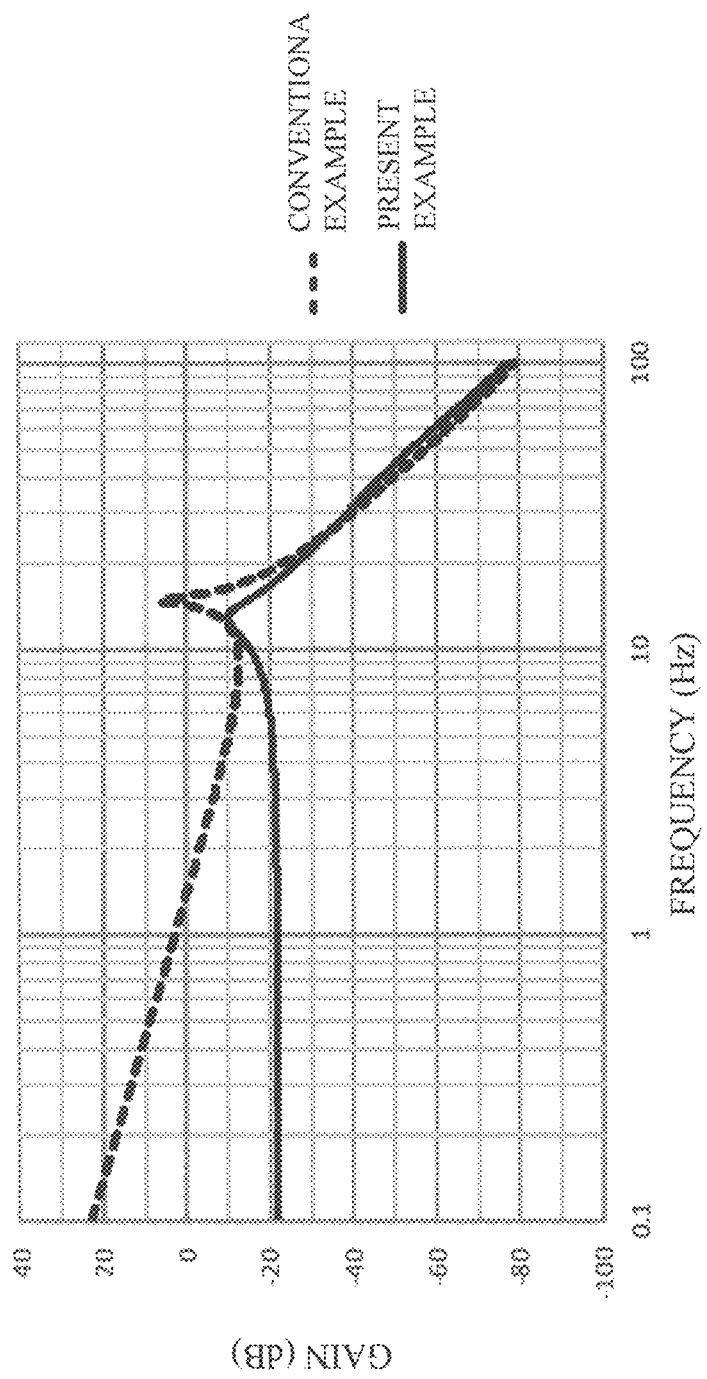

FIG. 4(a) illustrates the transfer characteristic of the engine 12, and FIG. 4(b) illustrates the transfer characteristic of the dynamometer 14. In both figures, this embodiment is shown by a solid line, and a conventional device (i.e., a device which uses a feedback control value, which is found at the PI control unit 201, as it is as a torque command value) is shown by a dotted line. Although a resonance point can be recognized between 10 Hz and 20 Hz in both results, it is possible with this embodiment to suppress the gain of the resonance point in comparison with a conventional device.

As described above, this embodiment subtracts a shaft torque value measured at the torque meter 36 from a torque command value, which is found at the PI control unit 201, to find a correction torque command value and controls the dynamometer 12 on the basis of the correction torque value. This makes it possible to cancel torque fluctuation of the engine 12 at the dynamometer 14 and accurately control the engine 12 on the basis of a target rotational frequency. Moreover, it is possible to suppress mechanical torsion of the shaft member 32, and it is therefore possible to suppress shaft resonance and prevent oscillation.

REFERENCE SIGNS LIST

10 Engine Test Apparatus
12 Engine
14 Dynamometer
16 Dynamo Control Unit
18 Engine Control Unit
20 Control Device
22 Frame
32 Shaft Member
34 Universal Joint
36 Torque Meter
200 Rotational Frequency Differential Value Calculating Unit
201 PI Control Unit
202 Correction Torque Command Value Calculating Unit

The invention claimed is:

1. An engine test apparatus comprising: a dynamometer, which applies torque via an output shaft of an engine; a torque meter configured to measure torque of the shaft; and a control device, which computes a torque command value using a rotational frequency feedback value obtained by measuring a rotational frequency of a rotation axis of the dynamometer in order to apply feedback control based on the rotational frequency to the dynamometer, wherein
the control device calculates a differential value between a preset rotational frequency target value under transient conditions and the rotational frequency feedback value, computes the torque command value using the differential value and a predetermined parameter, subtracts a value measured by the torque meter from the torque command value to find a correction torque command value, cancel torque fluctuation of the engine at the dynamometer, and control the dynamometer using the correction torque command value.

2. The engine test apparatus according to claim 1, wherein the control device comprises a rotational frequency differential value calculating unit, a PI control unit and a correction torque command value calculating unit.

3. The engine test apparatus according to claim 2, wherein the rotational frequency differential value calculating unit is configured to output the differential value between the preset rotational frequency target value under transient conditions and the rotational frequency feedback value to the PI control unit.

4. The engine test apparatus according to claim 2, wherein the PI control unit is configured to compute the torque command value using the differential value and the predetermined parameter and output the torque command value to the correction torque command value calculating unit.

5. The engine test apparatus according to claim 2, wherein the correction torque command value calculating unit is configured to subtract the value measured by the torque meter from the torque command value to find the correction torque command value and output the correction torque command value to a dynamo control unit to control the dynamometer.

6. The engine test apparatus according to claim 1, wherein the preset rotational frequency target value under transient conditions is a preset value in the control device.

7. An engine test method of causing a dynamometer to give a load to an output shaft of an engine via a shaft and applying feedback control based on a rotational frequency to the dynamometer, the engine test method comprising the steps of:
- calculating a differential value between a preset rotational frequency target value under transient conditions and a rotational frequency feedback value obtained by measuring a rotational frequency of a rotation axis of the dynamometer, computing a torque command value using the differential value and a predetermined parameter, and subtracting a measured torque value of the shaft from the torque command value to find a correction torque command value;
- cancelling torque fluctuation of the engine at the dynamometer, and
- controlling the dynamometer using the correction torque command value.

\* \* \* \* \*